No. 11,731. Reissued Apr. 11, 1899.

G. W. KORTRIGHT.

TELESCOPIC CLAMP.

(Application filed Feb. 9, 1899.)

Witnesses

L. C. Mills.

A. L. Hough

Inventor

George W. Kortright, by Franklin H. Hough

Attorney

THE NORRIS PETERS CO., PHOTO-LITHO., WASHINGTON, D. C.

UNITED STATES PATENT OFFICE.

GEORGE W. KORTRIGHT, OF SIOUX CITY, IOWA.

TELESCOPIC CLAMP.

SPECIFICATION forming part of Reissued Letters Patent No. 11,731, dated April 11, 1899.

Original No. 605,447, dated June 7, 1898. Application for reissue filed February 9, 1899. Serial No. 705,128.

*To all whom it may concern:*

Be it known that I, GEORGE W. KORTRIGHT, a citizen of the United States, residing at Sioux City, in the county of Woodbury and State of Iowa, have invented certain new and useful Improvements in Telescopic Clamps; and I do hereby declare that the following is a full, clear, and exact description of the same, which will enable others skilled in the art to which it appertains to make and use the same.

My invention relates to an improvement in telescopic clamps embracing two tubular shells or sections which are slotted and made of wedge shape or tapered form and one of which is located inside of the other, so that when one section is moved endwise relatively to the other one section will act against the other to force the outside section out and the inside section in, forming a clamp between the two parts to be clamped together.

My invention is clearly illustrated in the accompanying drawings, which form a part of this specification, and in which—

Figure 1:
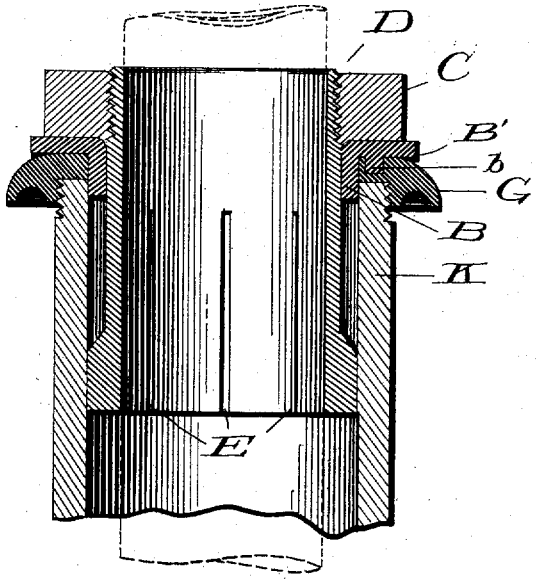
Figure 2:
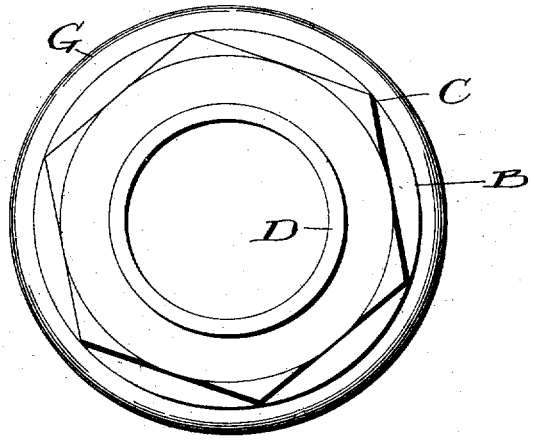

Figure 1 is a central longitudinal section through the clamp. Fig. 2 is an end view thereof.

Reference now being had to the details of the drawings by letter, B is the outer and larger shell or tube having an internal tapered surface and forming an outer tubular member.

D is the inner and smaller tube or shell having an externally-tapered surface and forming an inner tubular member.

C is the nut, which is screw-threaded on the top end of the inner tube and bears against the top of the outer tube.

E E are slots cut in the lower part of the inner tube, and F F are slots cut in the outer tube to correspond with the slots E E. Said slots E allow the outer tube to spread, and the slots F F allow the inner tube to contract, so that when the inner tube is drawn into the outer tube by the action of the nut on the outer end of said outer tube the two tubes will operate as wedges and the outer tube will spread at the same time that the inner tube contracts, thereby forming a solid joint outside and in.

The outer tube B is provided at its top with an outwardly-extending flange B′, against which the nut C bears.

K is the outer tubing, in which the clamp is inserted, the inner cylindric part, which is to be clamped in said outer tubing and is encircled by the main tube D, being indicated by dotted lines in Fig. 1. Said outer tubing K may be the front-fork spindle of a bicycle, and it is shown in the drawings as constituting such front-fork spindle and as provided with an annular cap G, forming the cone or cup member of a ball-bearing located at the top of said spindle and between the same and the tubular head of the bicycle-frame in which the said spindle turns. The cap G fits over the top of the outer tubing K and extends between the upper end of the same and the flange B′, and said cap may be attached to the tube in any suitable manner. The said flange B′ is shown as provided with a pin or stud *b*, which projects into the cap G. When the parts constituting the clamp are inserted and secured in the outer tubing K, the flange B′, with its stud, aids in holding the cap G in place both by confining said cap against the top of the tube and holding it from turning thereon.

Having thus described my invention, what I claim to be new, and desire to secure by Letters Patent, is—

1. A telescopic clamping device comprising in combination, an outer slotted and beveled tubular member, and an inner slotted tubular member having a beveled shoulder thereon bearing against said outer member, a nut screw-threaded on the projecting end of said inner member and engaging said outer member.

2. The combination with an outer tubular part, a telescopic clamping device adapted for insertion therein, comprising an outer slotted tube inserted in said outer tubular part and secured against downward movement therein, an inner slotted tube having screw-threads upon one end provided with a beveled surface bearing against said outer tube and a nut on the screw-threaded end of said inner tube and reacting against the end of the outer tube, whereby the inner clamping member is contracted and the outer clamping member is expanded.

3. The combination of an outer tubular part within which another part is to be secured, the adjusting-cone G screw-threaded on the end of the outer tube and telescopic clamp comprising inner and outer tubes slotted as described, the inner tube D being screw-threaded at its end and having an exterior beveled surface and the outer shell B, being slotted and having an interior beveled surface and a flanged outer end, a lug connecting cone G and flange B and a nut on the screw-threaded end of the inner tube D whereby the outer and inner tube, the inner tube D and the shell B and the adjusting-cone G are all locked together as shown and described.

4. A telescopic clamping device, comprising inner and outer tubular members, provided with coacting wedge-surfaces, by which said inner and outer members are expanded by relative endwise movement thereof, one of said members having at one end a non-slotted, screw-threaded part and a nut engaging the member having said screw-threaded part, said nut being arranged to bear endwise against the other member to give relative endwise movement to the said members.

In testimony that I claim the foregoing as my invention I affix my signature, in the presence of two witnesses, this 6th day of January, 1899.

GEORGE W. KORTRIGHT.

Witnesses:

H. C. GARDINER,

MAYE B. HALLAHAN.